United States Patent
Julka et al.

(10) Patent No.: US 7,457,265 B2
(45) Date of Patent: Nov. 25, 2008

(54) MOBILITY MANAGEMENT ENTITY FOR HIGH DATA RATE WIRELESS COMMUNICATION NETWORKS

(75) Inventors: Vibhor Julka, San Diego, CA (US); Sanjeevan Sivalingham, San Diego, CA (US); Roger Gustavsson, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1436 days.

(21) Appl. No.: 10/002,723

(22) Filed: Nov. 16, 2001

(65) Prior Publication Data

US 2002/0193110 A1 Dec. 19, 2002

Related U.S. Application Data

(60) Provisional application No. 60/297,908, filed on Jun. 13, 2001.

(51) Int. Cl.
*H04Q 7/00* (2006.01)
*H04L 12/56* (2006.01)

(52) U.S. Cl. .................. 370/331; 370/401; 370/349; 370/352; 370/441; 370/342; 455/436; 455/435; 455/432; 455/450; 455/560

(58) Field of Classification Search .................. 455/436, 455/435, 440, 439, 456, 432, 433, 450, 560, 455/445, 432.1, 435.1; 370/310, 331, 328, 370/329, 252, 338, 335, 342, 349, 432, 401, 370/352, 441, 332, 351, 442; 709/227, 203, 709/228, 229, 249

See application file for complete search history.

(56) References Cited

U.S. PATENT DOCUMENTS

| | | | |
|---|---|---|---|
| 6,285,880 B1 * | 9/2001 | Gagnon et al. | 455/432.1 |
| 6,580,699 B1 * | 6/2003 | Manning et al. | 370/331 |
| 6,708,031 B2 * | 3/2004 | Purnadi et al. | 455/436 |
| 6,721,565 B1 * | 4/2004 | Ejzak et al. | 455/436 |
| 6,912,214 B2 * | 6/2005 | Madour et al. | 370/340 |
| 7,035,636 B1 * | 4/2006 | Lim et al. | 455/433 |
| 2001/0012279 A1 * | 8/2001 | Haumont et al. | 370/331 |
| 2001/0050907 A1 * | 12/2001 | Madour et al. | 370/329 |

(Continued)

*Primary Examiner*—Duc Nguyen
*Assistant Examiner*—Julio R Perez
(74) *Attorney, Agent, or Firm*—Coats & Bennett, P.L.L.C.

(57) ABSTRACT

A session controller provides mobility management support in a 1xEVDO wireless communication network, such as one configured in accordance with the TIA/EIA/IS-856 standard. Operating as a logical network entity, the SC maintains location (e.g., a pointing tag) and session information at an access network controller (ANC) granularity, thus allowing it to track access terminal (AT) transfer between ANCs but within subnet boundaries, where a network subnet comprises one or more ANCs. This allows a packet control function (PCF) to maintain location information at a packet zone granularity, thereby reducing mobility management overhead at the PCF. The SC provides updated tag and session information to PCFs, ANCs, and other SCs as needed. Information exchange with other SCs arises, for example, when two or more SCs cooperate to maintain or transfer routing and session information across subnets.

57 Claims, 10 Drawing Sheets

U.S. PATENT DOCUMENTS

| | | | |
|---|---|---|---|
| 2002/0048266 A1* | 4/2002 | Choi et al. .................. 370/331 |
| 2002/0064144 A1* | 5/2002 | Einola et al. ................ 370/335 |
| 2002/0068565 A1* | 6/2002 | Purnadi et al. .............. 455/436 |
| 2002/0068570 A1* | 6/2002 | Abrol et al. ................. 455/438 |
| 2002/0077105 A1* | 6/2002 | Chang ........................ 455/436 |
| 2002/0114293 A1* | 8/2002 | Madour et al. .............. 370/329 |
| 2002/0145990 A1* | 10/2002 | Sayeedi ....................... 370/335 |
| 2002/0176382 A1* | 11/2002 | Madour et al. .............. 370/331 |
| 2003/0223383 A1* | 12/2003 | Chang et al. ................ 370/310 |
| 2004/0105400 A1* | 6/2004 | Jean ........................... 370/311 |
| 2005/0025116 A1* | 2/2005 | Chen et al. .................. 370/349 |

* cited by examiner

MOBILITY MANAGEMENT ENTITY FOR HIGH DATA RATE WIRELESS COMMUNICATION NETWORKS

RELATED APPLICATIONS

This application claims priority benefit under 35 U.S.C. 119(e) from the U.S. provisional application Ser. No. 60/297,908, filed on Jun. 13, 2001, and entitled "A Method for Time-Stamp Based Replay-Protection and PDSN Synchronization at the PCF," which is incorporated in its entirety by reference herein.

BACKGROUND OF THE INVENTION

The present invention generally relates to high data rate wireless communication networks, and particularly relates to mobility management in data-only networks, such as in TIA/EIA/IS-856 based networks.

Advanced high data rate wireless communication networks offer subscribers the range of applications and convenience available only with relatively high bandwidth communication between the subscribers' access terminals and the wireless access network. One approach to achieving higher bandwidth involves the use of data-only access networks, with first generation evolution, data-only (1xEVDO) networks representing an example of this approach.

1xEVDO networks generally follow the TIA/EIA/IS-856 interim standard, which specifies a framework for high data rate (HDR) packet data communication between a public data network (PDN), such as the Internet, and subscribers' access terminals. 1xEVDO networks forego the use of a mobile switching center (MSC), instead of using a packet control function (PCF) to route subscriber data between a packet data serving node (PDSN) interfaced to a PDN and an access network controller (ANC) supporting the subscribers' access terminals.

Each ANC manages the radio resources for one or more access network transceiver systems (ANTS), which provide the actual radio resources for radio frequency control and data signaling between the wireless access terminals and the network. Typically, the ANCs are arranged in subnets, with one or more ANCs per subnet. The PCF supports access terminal connections across multiple subnets and is responsible for routing data to the appropriate ANC within an access terminal's current subnet.

Mobility management, that is, tracking movement of access terminals between ANCs and between subnets, is complicated by the nature of packet data communications. Many types of packet data sessions, such as web browsing, involve intermittent activity with relatively long periods of dormancy. For example, an access terminal may establish a connection to the network through a given ANC within a given subnet and then, while dormant, move to the service area of another ANC, either in the same subnet, or possibly within a different subnet.

This type of dormant handoff poses challenges in managing the mobility of an access terminal that has an open connection with the network but moves between ANCs and subnets within the network during periods of dormancy. Ideally, an approach to mobility management within the network would minimize network control traffic overhead, require only minimal changes at the PCF and ANC to maintain compatibility with current implementations of those entities, and provide flexibility in defining the size of subnets within the network.

SUMMARY OF THE INVENTION

The present invention comprises methods and apparatus for access terminal (AT) mobility management in a high data rate packet network, such as a wireless communication network configured in accordance with the TIA/EIA/IS-856 standard. A logical entity referred to herein as a "session controller" facilitates access terminal (AT) mobility management at the subnet granularity, thereby reducing the amount of network communication and processing overhead associated with AT mobility management, particularly at the packet control function (PCF).

A SC provides AT mobility management within its corresponding subnet, where each subnet comprises one or more access network controllers (ANCs). The SC tracks movement of dormant ATs between ANCs in its subnet, and can cooperate with other SCs to support mobility management across subnets. This arrangement eliminates the need to involve the PCF in the handoff of dormant ATs between ANCs within the same subnet, and allows a single subnet to span multiple ANCs.

In supporting mobility management within 1xEVDO networks, the SC preferably provides one or more of the following mobility management functions: Unicast Access Terminal Identifier (UATI) assignment, AT session information maintenance; selected air interface protocol support; and A13/A14 message support associated with mobility management. In at least one embodiment, the use of independent routing tags in the SC and the PCF supports at least some of the above functionality.

When an AT establishes or reestablishes an active connection with the network, the PCF and SC store routing tags identifying the ANC through which that connection is established. The SC additionally stores session information for the connection. Subsequently, the AT may go dormant, although the Point-to-Point (PPP) connection between the PDSN and the AT is maintained. As the dormant AT moves between ANCs within a given subnet, the corresponding SC updates its routing tag to reflect this movement. Further, the SC provides session information associated with the AT to the receiving ANC, and causes the ANC that was supporting the AT to clear its session information for the AT.

These SC functions allow the network to successfully reinitiate packet delivery to the AT, even if the PCF-based routing tag is outdated. That is, the PCF directs a service request to the ANC pointed to by its routing tag. If the AT has moved from this ANC, the ANC forwards the service request to the SC, which in turn contacts the ANC pointed to by its routing tag. In response, the SC-selected ANC pages the AT and sets up the required connections with the PCF, which action causes the PCF to update its routing tag.

In other instances, for example, where a dormant AT moves across subnets, both the PCF and the SC might track this change and update the routing tag and other information appropriately. The SC in the receiving subnet might cooperate with the SC in the first subnet in terms of tracking this movement and updating the associated information. Other SC-to-SC communication might arise when a given SC queries other SCs regarding the current location of an AT, for example.

DETAILED DESCRIPTION OF THE INVENTION

While the following discussion bases its exemplary details on a 1xEVDO wireless communication network configured in accordance with the TIA/EIA/IS-856 standard, it should be understood that the techniques for mobility management described herein have applicability beyond these specific network types. Thus, the present invention may find utility in 1xEVDO networks, in other types of existing networks, and in forthcoming networks based on yet to be developed standards.

Figure 1:
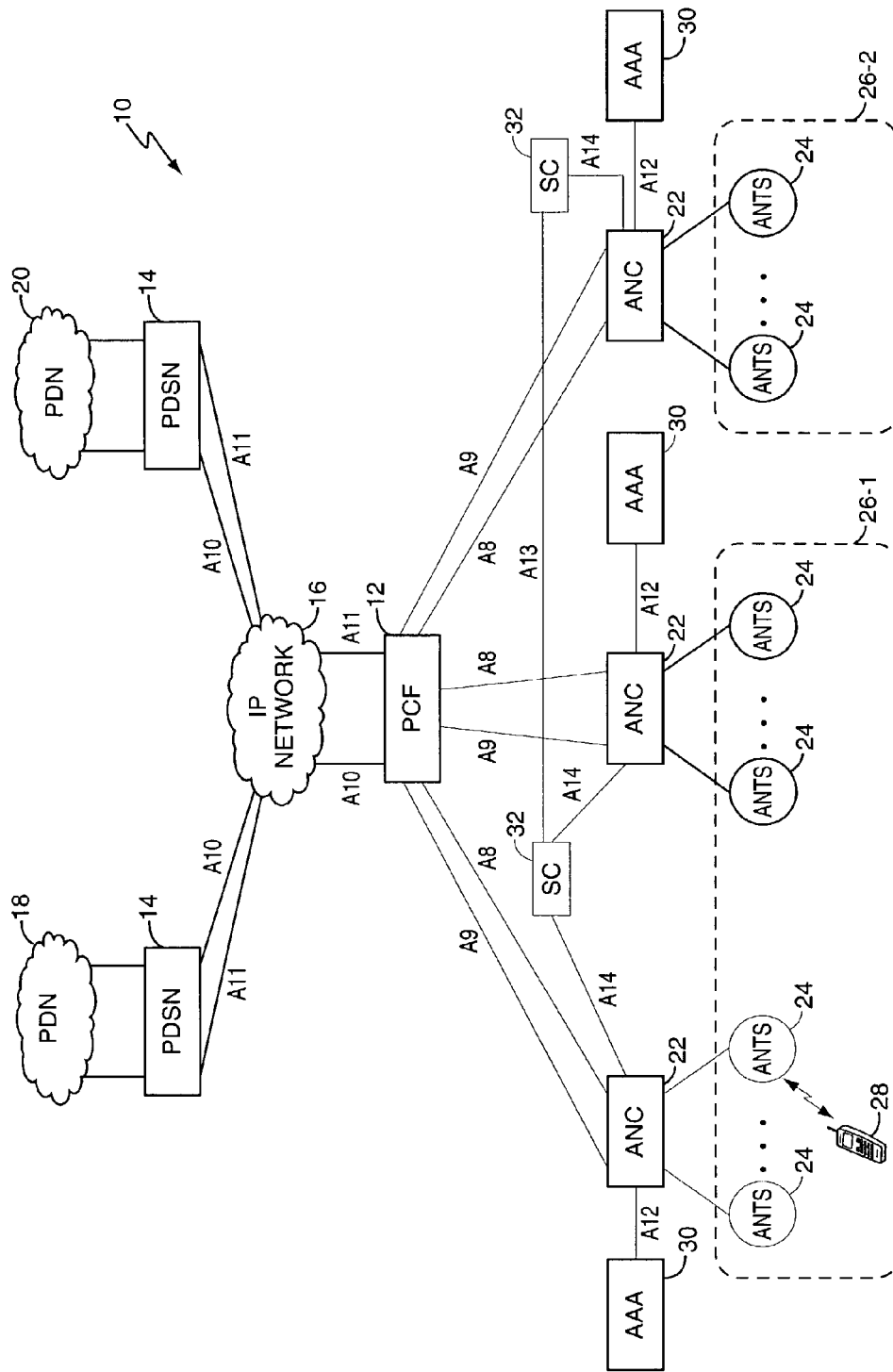
FIG. 1 is a diagram of an exemplary wireless communication network, including the session controller entity of the present invention.

Turning now to the drawings, FIG. 1 is a diagram of a wireless communication network generally referred to by the numeral 10. The exemplary network 10 comprises a PCF 12 coupled to one or more PDSNs 14 through an IP network 16, which PDSNs 14 in turn couple the network 10 to one or more PDNs 18 and 20 (e.g., the Internet or other packet data networks). The network 10 further comprises a plurality of access network controllers (ANCs) 22 (sometimes referred to as base station controllers or BSCs), with each ANC 22 providing control and call processing support to one or more ANTS 24 (sometimes referred to as radio base stations or RBSs). It should be noted that FIG. 1 is an exemplary logical diagram; the physical implementation of the network 10 may differ.

Each ANTS 24 provides radio coverage for a given area. The ATs 28 connect to the network 10 through wireless communication with the ANTS 24, which contain the necessary radio resources. The network 10 also comprises an authentication, authorization, and accounting (AAA) entity 30 involved in authorizing and accounting for such access, and one or more session controllers (SCs) 32, which in the practice of the present invention, facilitate mobility management of the ATs 28 within the network 10.

One or more ANTS 24 may be grouped into a subnet 26. The illustrated network comprises two subnets (26-1 and 26-2), but an actual implementation may have a lesser or greater number of subnets 26, and may have a lesser or greater number of ANTS 24 within each subnet.

In operation, packet data flows between the ATs 28 and the PDN 18 or 20 via the network 10. In facilitating this data flow, the network 10 routes packet data to and from the individual ATs 28 based on routing information identifying the correct ANC 22 for each AT 28. In this context, "correct" simply denotes the ANC 22 currently supporting the connection with a given AT 28. In the case of data delivery to a dormant AT 38, the PCF 12 receives packet data from the PDN 18, for example, through one of the PDSNs 14, and uses its routing tag information to identify the ANC 22 to which it should forward the data. Once the data reaches the correct ANC 22 that ANC 22 determines to which ANTS 24 the data should be routed for radio transmission to the AT 28 in question.

In general, one SC 32 supports one subnet 26, which may comprise one or more ANCs 22, with each ANC 22 supporting a number of ANTS 24. The present invention defines an A14 signaling interface for communication between the SC 32 and the ANCs 22 within the corresponding subnet 26. This signaling interface permits transfer of session related information between the ANCs 22 and the SC 32, thus facilitating mobility management operations.

Exemplary messages include the following items:
- A14 Unicast Access Terminal Identifier (UATI) Assignment Request/Response
- A14 Session Information Update Request/Response
- A14 SC Service Request/Response
- A14 Connection Setup Request/Response
- A14 Session Info Cancel Request/Response The above messages and the associated functions or network operations associated with their use are explained more fully below. Also, note that inter-ANC signaling for facilitating efficient inter-ANC handoff of dormant ATs 28 might be supported via A13 signaling between the involved ANCs 22.

In at least one embodiment of the present invention, mobility management is distributed between ANCs 22, SCs 32, and PCFs 12. In particular, a given ANC 22 is responsible for AT location management down to the granularity of a single ANTS 24 under control of the ANC 22. This implies that the ANC 22 is responsible for paging ATs 28 supported by ANTS 24 under its control (i.e., within the "domain" of the ANC 22). Limiting required ANC-based paging in support of network initiated packet delivery to a dormant AT 28 allows for efficient paging operations within the context of the present invention. A given SC 32 is responsible for location management across ANCs 22 within a given subnet 26, and, in some instances, across subnets 26. Providing intra-subnet mobility management for dormant ATs 28 via the SC 32 eliminates the need to involve the PCF 12 in intra-subnet handoffs of dormant ATs 28.

It should be understood that SCs 32 could be co-located with an ANC 22, or co-located with the PCF 12. In the first case, co-location with an ANC 22 limits the footprint of the SC 32 to the coverage area of the ANC 22 with which it is co-located. While this might be desirable in certain network arrangements, it does miss the opportunity to use a given SC 32 to manage AT mobility across two or more ANCs 22 within or across subnets 26. In the second case, co-location of the SC 32 with PCF 12 may be desirable in certain network arrangements, but does not necessarily relieve the PCF-related communication links from mobility management traffic associated with the SCs functionality.

In an exemplary approach, SCs 32 are at least logically maintained separately from ANCs 22 and PCFs 12, such that one SC 32 may provide mobility management for multiple ANCs 22, and further such that mobility management traffic between ANCs 22 and SCs 32 does not burden the communication links (A interfaces) to the PCF 12.

Figure 2:
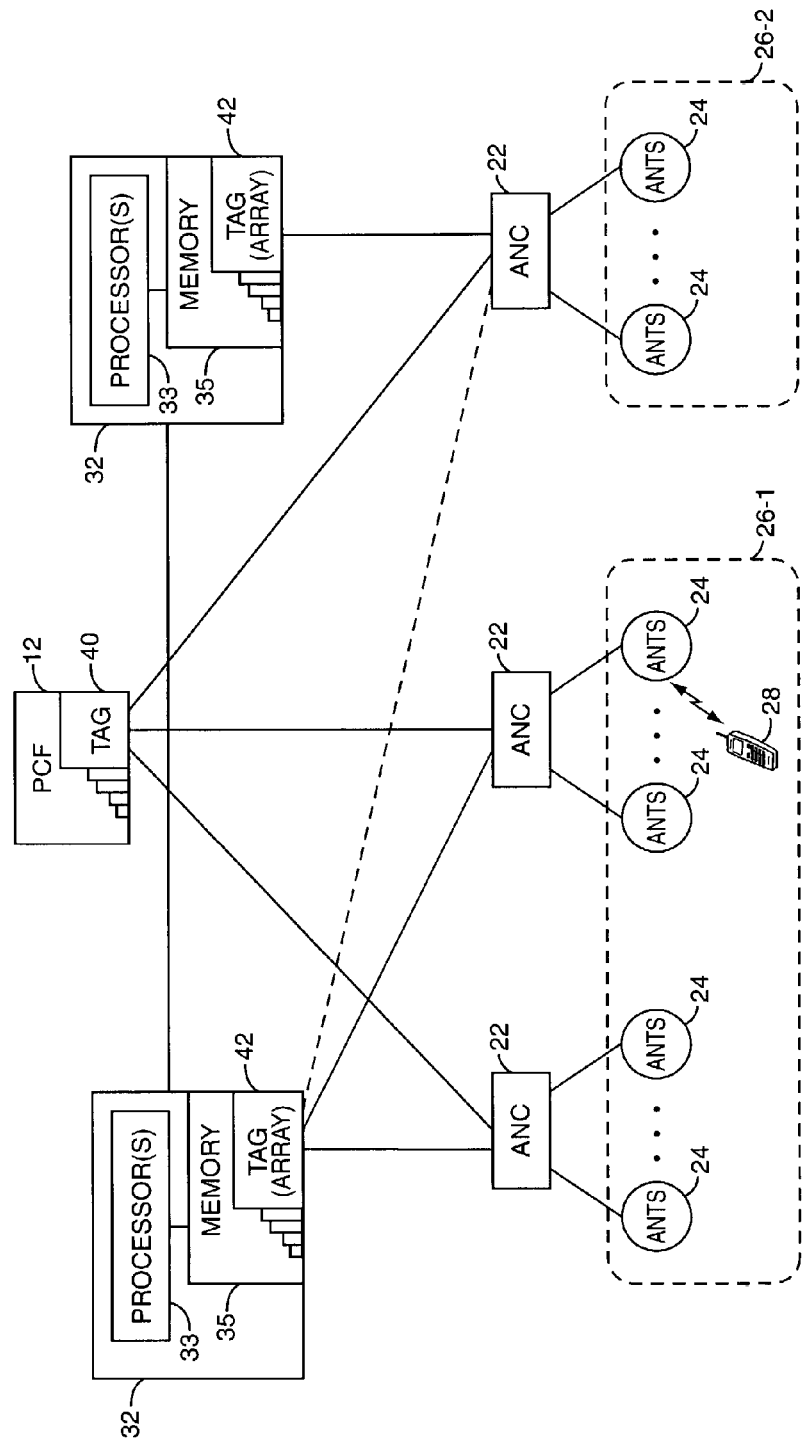
FIG. 2 is a simplified version of the network of FIG. 1 and illustrates the use of PCF and SC routing tags.

In this context, paging efficiency and reduction of overall PCF-involved signaling derives from the use and management of SC-based and PCF-based routing tags. FIG. 2 presents a simplified illustration of the network 10, focusing on the PCF 12, ANCs 22, and SCs 32, and further depicts routing tags 40 and 42 located in the PCF 12 and SCs 32, respectively.

The PCF 12 maintains a routing tag 40 ($TAG_{PCF}$) for each AT 28 having a connection supported by the PCF 12. Each $TAG_{PCF}$ has a corresponding tag array 42 ($TAG_{SC}$) maintained by the SC 32 for that AT 28. The following discussion focuses on operations involving one $TAG_{PCF}$ and the corresponding tag array $TAG_{SC}$ for a given AT 28. It should be understood that the PCF 12 and SC 32 would apply the same management logic to multiple sets of routing tags 40 and 42 associated with a plurality of ATs 28.

In general, the PCF 12 updates $TAG_{PCF}$ each time it receives a service request (e.g., an A9 Setup A8 message) for an AT 28 from one of the ANCs 22 supported by the PCF 12. That is, the PCF 12 causes $TAG_{PCF}$ to "point" to the last ANC 22 that requested service for the AT 28. This setting of $TAG_{PCF}$ may be accomplished by setting $TAG_{PCF}$ to an identification value corresponding to one of the ANCs 22 supported by the PCF 12. For example, assume that the PCF 12 supports N ANCs 22 arranged as one or more subnets 26. These N ANCs 22 might be identified by ANC_IDs (1 ... N) where there are N such ANCs 22. Thus, ANCIDs in this scenario would be ANC1, ANC2, ANC3, ..., ANC N.

A subset K of these N ANCs 22 might correspond to a given subnet 26. Thus, the SC 32 associated with that subnet 26 might maintain the corresponding $TAG_{SC}$ as an array of ANC_ID values (1 ... K). That is, the SC 32 maintains $TAG_{SC}$ as an array of pointers $\{AN_1, AN_2 ..., AN_i ..., AN_K\}$. Each array entry points to one of K ANCs 22. Generally, the SC 32 maintains the entries in $TAG_{SC}$ based on movement of the AT 28 within and between subnets 26. Thus, the SC maintains routing information that indicates which of the ANCs 22 is currently identified with the AT 28.

The array $TAG_{SC}$ is a set of pointers to the ANCs 22 supported by the SC 32. Setting an array entry to one (1) indicates that the ANC 22 corresponding to that array entry has session information for the AT 28. Conversely, clearing an entry in $TAG_{SC}$ indicates that the corresponding ANC 22 does not have session information for the AT 28. Thus, $TAG_{SC}$ may be initialized by setting all elements to zero (i.e., $AN_i=0$ for all i=1 ... K). Then, in mobility management operations, the SC 32 may set (1) or clear (0) each element of the tag array based on A14 signaling messages received from or sent to the ANCs 22. For example, the SC 32 sets ANi of $TAG_{SC}$ to one (1) if the SC 32 receives an A14 Session Information Update message from ANCi; sends an A14 Session Information Update message to ANCi; or sends an A14 Session Information Response message to ANCi. In contrast, the SC 32 clears ANi of $TAG_{SC}$ if the SC 32 receives an A14 Session Information Cancel Request message from ANCi or if the SC 32 sends an A14 Session Information Cancel Request message to ANCi.

For example, assume that the SC 32 supports three ANCs 22, denoted as ANC1, ANC2, and ANC3. Further, assume that the SC 32 receives a Session Information Cancel Request message from ANC1. The SC 32 first sets AN1 in $TAG_{SC}$ to zero. It then checks whether any other ANC 22 operating under its control has session information for the AT 28 (i.e., is at least one of AN2 and AN3 in $TAG_{SC}$ non-zero?). If not, this condition might indicate that the SC 32 has lost track of the AT 28. If so, it sends an A14 Session Information Update message to all ANCs 22 (ANC1, ANC2, and ANC3). In response, these ANCs page the AT 28.

Each ANC 22 (i.e., ANC1, ANC2, and ANC3) receiving the Session Information Update message attempts to page the AT 28, but only one of them will receive a page response. Those ANCs not receiving a page response from the AT 28 will send A14 Session Information Cancel Request messages to the SC 32, which in turn will clear the corresponding entries in $TAG_{SC}$. Thus, this procedure allows the SC 32 to "find" the AT 28 and appropriately clear and set entries in $TAG_{SC}$ to reflect the current location of the AT 28.

When an ANC 22 receives a Route Update or other communication from an AT 28 for which it has no session information, the ANC 22 queries the SC 32 for session information by sending an A14 Session Information Update Message. When the SC 32 receives such a request from ANCi, it returns the needed session information to ANCi in the form of an A14 Session Information Update Response message. Typically, session information contains the following pieces of information (if applicable): air interface protocol attributes and associated public data (the format of this information is specified in TIA/EIA/IS-856 standards); PDSN address (e.g., IP v4 address); Mobile Identity (MN_ID); Access Network Identifiers (PANID/CANID).

Further, since this request indicates that the AT 28 is located at the requesting ANC (ANCi), the SC 32 sets $TAG_{SC}$ to point to ANCi. The SC 32 also checks to see if $TAG_{SC}$ indicates any other ANCs 22 have session information for the AT 28 (i.e., are any $ANj \neq 0$ in $TAG_{SC}$, where $j \neq i$?). For any such entries (i.e., $ANj \neq 0$ and where $j \neq i$), the SC 32 sends an A14 Session Information Cancel message to the corresponding ANC(s) 22, and clears ANj.

In general, the range of mobility management scenarios includes at least initial connection establishment, intra- and inter-subnet dormant handoff, and connection reestablishment (reactivation of a dormant AT 28). The functionality associated with operations in these general scenarios may be better understood in the context of SC-based mobility management operations.

To that end, an exemplary set of call flow diagrams follows, illustrating exemplary functionality for selected operations. In supporting these and other operations, it should be understood that the SCs 32 generally comprise one or more processors or processing systems 33 having supporting memory 35. In actual implementation, memory 35 may comprise several types of memory, including but not limited to volatile working memory for program execution, non-volatile memory for configuration data and parameter storage, and disk storage for database and operating program storage. Similarly, it should be understood that ANCs 22, PCFs 12, PDSNs 14, and other network entities each comprise processing and communication resources.

Figure 3:
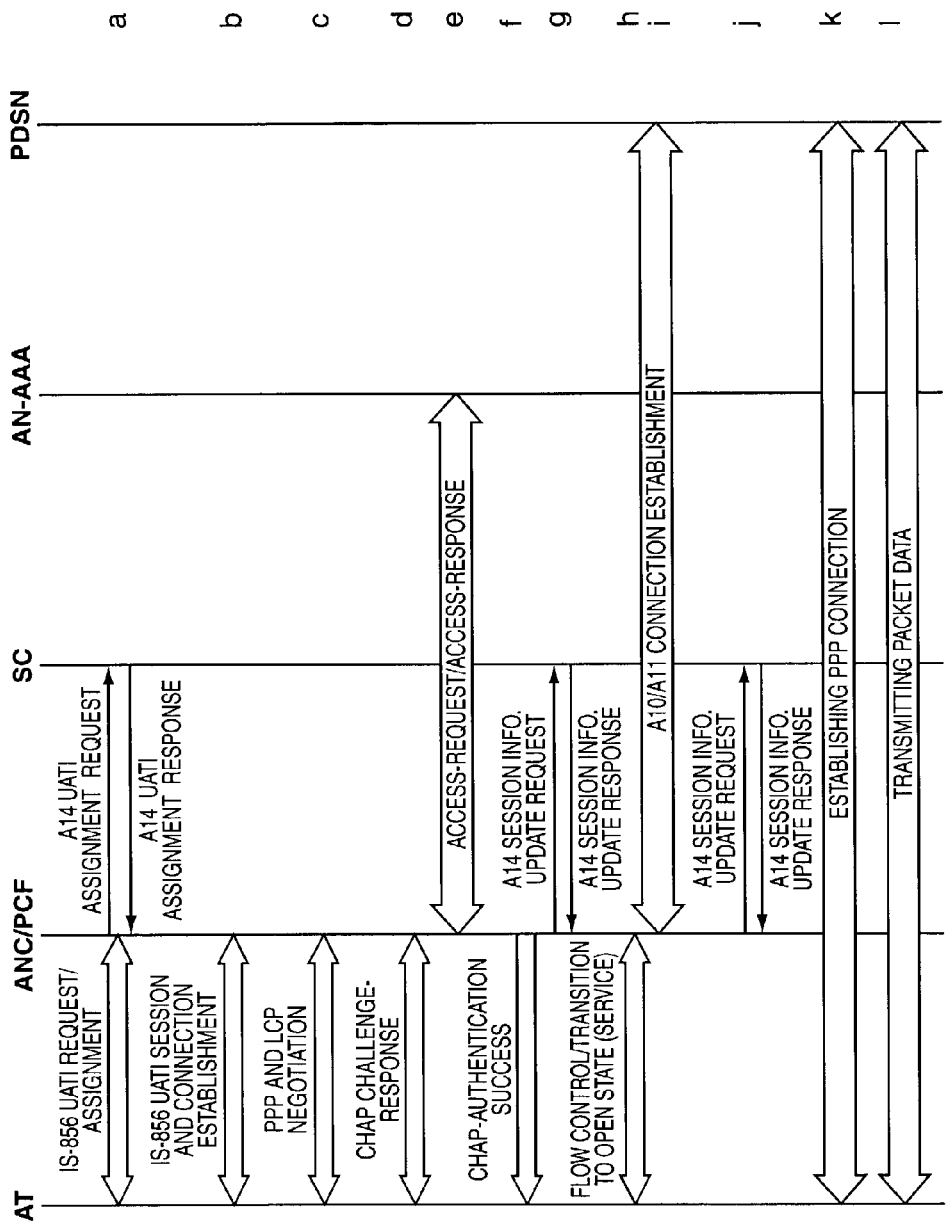
FIG. 3 is a call flow diagram of an access terminal establishing a network connection.

The exemplary call flow diagrams begin with FIG. 3, which diagrams the call flow of an AT 28 originating a 1xEVDO connection with the network 10. This connection allows data transfer between the PDN 18 and the AT 28. One may refer to FIG. 1 for identification of the interface nomenclature used in the following discussion (e.g., A8/A9, A10/A11, A14 interfaces). Establishing the connection between the AT 28 and the network 10 includes the following steps:

a. The AT 28 and a given one of the ANCs 22 perform IS-856 Unicast Access Terminal Identifier (UATI) Assignment procedures. Upon receipt of the UATI Assignment message the ANC 22 sends an A14 UATI Assignment Request message to the SC 32. The SC 32 performs UATI assignment and sends an A14 UATI Assignment Response message to the ANC 22, which in turn will send the associated air interface message to the AT 28.

b. The AT 28 and ANC 22 perform IS-856 session and connection establishment (the reader may refer to the Interim Standard document IS-878, Section 2.1.1).

c. The AT 28 and the ANC 22 initiate Point-to-Point Protocol (PPP) and Link Control Protocol (LCP) negotiations for access authentication, which may be done in accordance with the Request for Comments (RFC) 1661 covering PPP.

d. The ANC 22 generates a random challenge and sends it to the AT 28 in a Challenge Handshake Authentication Protocol (CHAP) Challenge packet in accordance with the Request for Comments (RFC) 1994.

e. When the ANC 22 receives the CHAP response packet from the AT 28, the ANC 22 and the access network AAA 30 exchange RADIUS messages per A12 Access Authentication procedures. The Access-Accept contains a RADIUS attribute with Type set to 20 (Callback Id), Length set to 15, and the String field set to the 15 digit mobile number (MN) ID. One may refer to the Request for Comments (RFC) 2865 for details regarding RADIUS.

f. The ANC 22 returns an indication of CHAP authentication success to the AT 28.

g. The ANC 22 sends session related information (including the assigned UATI, MN_ID, previous/current access network identifiers (PANID/CANID) if applicable and available) to the SC 32 via the A14 Session Info Update Request-Response messages. This step can occur anytime after the ANC 22 receives an Access-Accept packet from the AN-AAA. The SC 32 will set $TAG_{SC}$ (i.e., tag 42) to this ANCID as where the AT 28 is currently located.

h. The AT 28 indicates to the ANC 22 and the PCF 12 that it is ready to send/receive data (e.g. this will involve the exchange of XonRequest/XonResponse messages to request transition to the Open State (service stream)).

i. The PCF 12 and the PDSN 14 perform A10/A11 Connection establishment as per TIA/EIA/IS-2001-A, Section 2.15.

j. The ANC 22 sends updated session related information (in this scenario the PDSN Address associated with the A10 connection) to the SC 32 via the A14 Session Info Update Request/Response messages. This step can occur anytime after the ANC 22 initiates A8/A9 procedures. This procedure can also be executed whenever session information at the ANC 22 is changed (e.g. upon updating of the authentication keys, renegotiation of IS-856 protocols).

k. The PDSN 14 and the AT 28 establish the link layer (PPP) connection and then perform (mobile Internet protocol) MIP registration procedures over the PPP connection per TIA/EIA/IS-835-A.

l. After completion of the MIP registration, the connection is established and packet data can flow between the AT 28 and the PDSN 14.

Figure 4:
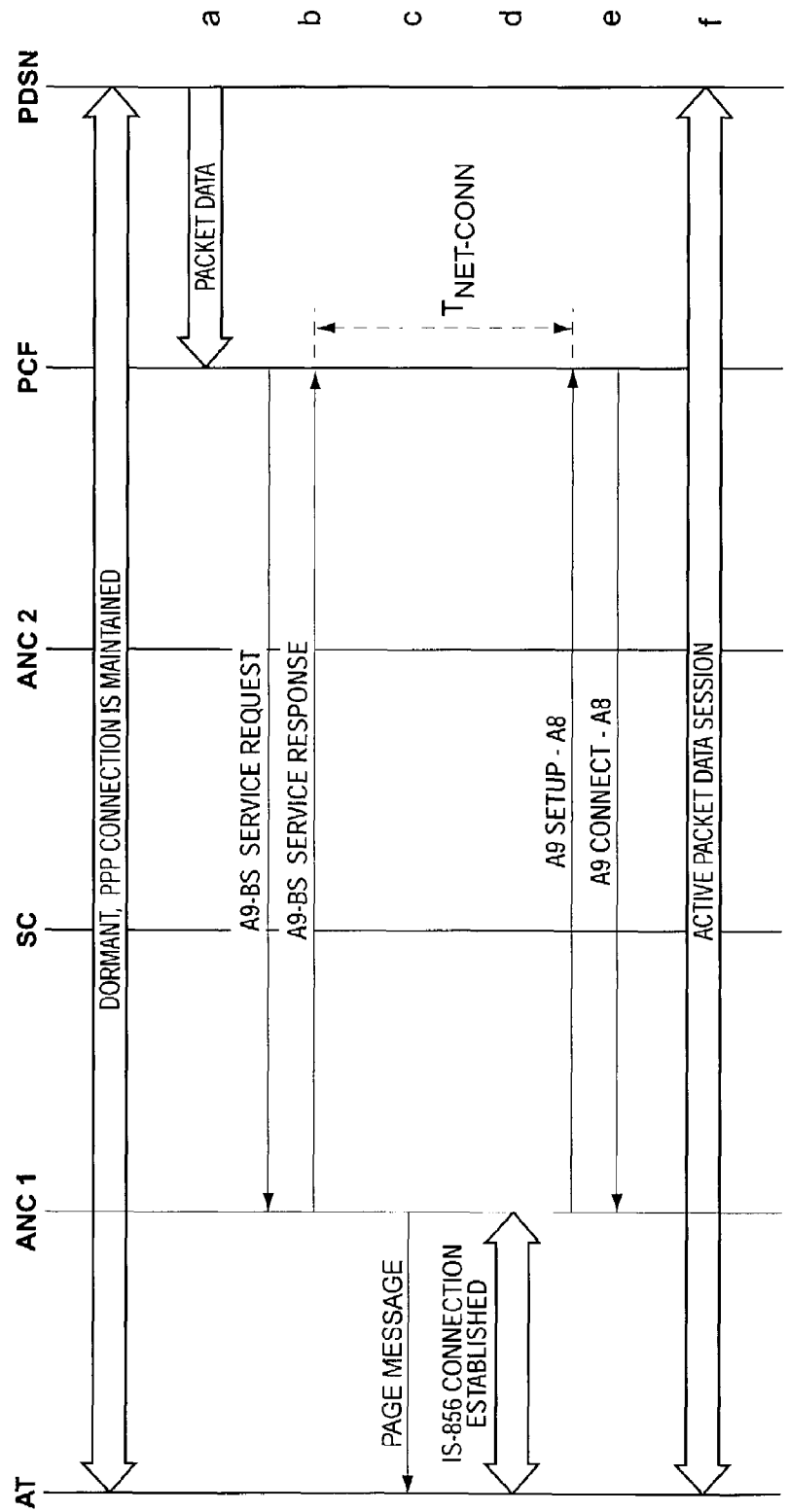
FIG. 4 is a call flow diagram of network-initiated call re-activation where the PCF routing tag is current.

FIG. 4 illustrates re-establishing an active connection with a dormant AT 28. Here, the AT 28 has a dormant PPP connection with a PDSN 14, but is not engaged in data transfer with the network 10. This scenario assumes the presence of at least ANC1 and ANC2, and that the AT 28 last established an active connection with the network 10 through ANC1, and that the AT 28 has not moved from the coverage area of ANC1. Because ANC1 was last used to service the AT 28, $TAG_{PCF}$ points to ANC1, and the corresponding entry "AN1" in the array $TAG_{SC}$ in the SC 32 is set to "1," indicating that ANC1 has session information for the AT 28.

New packet data intended for the dormant AT 28 arriving at the PDSN 14 initiates reactivation of the connection with the AT 28. Re-establishing connection with the AT 28 comprises the following steps:

a. The PDSN 14 sends data packets for an AT 28 on an existing A10 connection.

b. The PCF executes A9 base station (BS) Service Request/Response procedures with the ANC 22 specified by $TAG_{PCF}$ (tag 40), which points to ANC1. Upon receipt of the A9-BS Service Response message, the PCF 12 starts the timer $T_{NET\_CONN}$.

c. In this scenario, $TAG_{PCF}$ points to the correct ANC 22. ANC1 has session information for the AT 28 in question, and ANC1 sends a page message to the AT 28 over the control channel.

d. The AT 28 and ANC1 establish a radio connection per IS-856.

e. ANC1 and the PCF 12 perform A8/A9 connection establishment. For consistency, the PCF 12 might reset $TAG_{PCF}$ to point to ANC1, although it could leave $TAG_{PCF}$ unchanged since it already points to ANC1. Upon receipt of the A9-Setup-A8 message, the PCF 12 stops the $T_{NET\_CONN}$ timer used to time the connection setup responsive to the service request/response exchange.

f. After the radio link and the A8 connection have been established, data can be exchanged between the AT 28 and the PDSN 14 via the restored active data connection.

Figure 5:
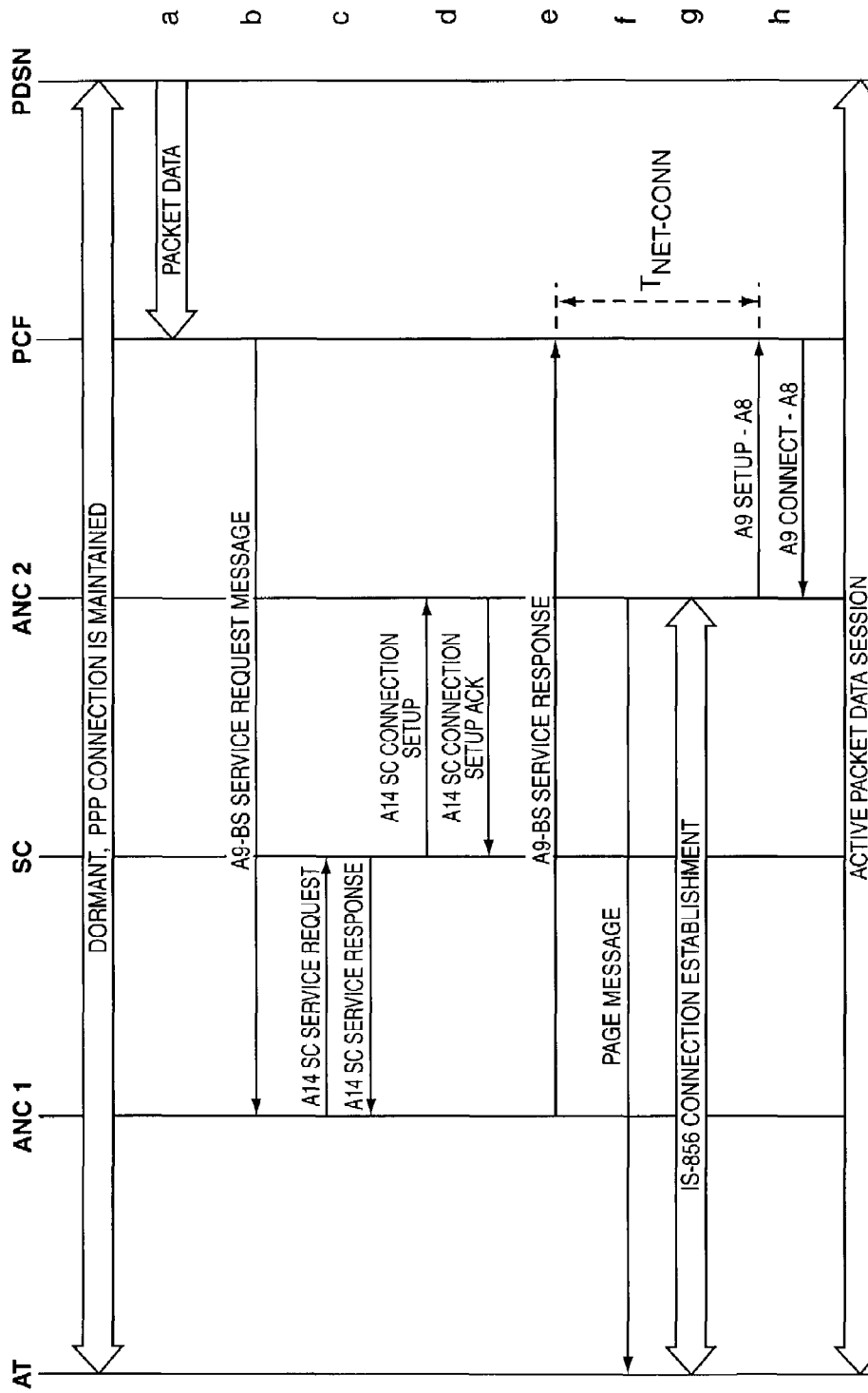
FIG. 5 is a call flow diagram of network-initiated call re-activation where the PCF routing tag is out of date.

FIG. 5 illustrates an approach to network-initiated call re-activation where the PCF 12 does not have up-to-date routing tag information, perhaps because the AT 28 has undergone a dormant mobile handoff between ANCs 22 within the same subnet 26. Here, the scenario assumes that ANC1 supported the last active connection with the AT 28. Thus, $TAG_{PCF}$ in the PCF 12 points to ANC1, which is out-of-date owing to the dormant handoff of the AT 28 from ANC1 to ANC2.

When the dormant AT 28 was handed off from ANC1 to ANC2, it sent a Route Update message to ANC2. ANC2, recognizing that it had no session information for the AT 28, queried the SC 32 using the A14 signaling messages Session Information Update Request/Response.

This action caused the SC 32 to update the array entries for ANC1 and ANC2 in $TAG_{SC}$, and provide ANC2 with the requested session information. Further, the SC 32 prompted ANC1 to kill or otherwise clear its session information for the AT 28, since it was handing off control of the AT 28 to ANC2. Clearing session information in this manner prevents ANCs 22 from retaining information for ATs 28 no longer in their coverage area.

Thus, the scenario is that the PCF 12 incorrectly identifies ANC1 with the AT 28, while the SC 32 correctly identifies ANC2 with the AT 28. ANC1, receiving a service request from the PCF 12, essentially redirects this service request to the SC 32, so that SC 32 can notify ANC2 that the PCF 12 desires communication with AT 28. Upon this service request redirection via the SC 32, ANC2 can establish a connection between the AT 28 and the PCF 12.

Re-activation is made efficient in the above scenario by virtue of the mobility management functions of the SC 32, and comprises the following steps:

a. The PDSN 14 sends data packets for the AT 28 on an existing A10 connection (the dormant connection).

b. The PCF 12 executes A9 BS Service Request/Response procedures with the ANC 22 pointed to by $TAG_{PCF}$ (ANC1). ANC1 no longer has session information for the AT 28 because the SC 32 caused ANC1 to clear such session information in response to the dormant AT moving into the coverage area of another ANC 22 (ANC2). In other words, a dormant handoff has caused $TAG_{PCF}$ to become outdated.

c. In response to receiving a service request from the PCF 12 for the AT 28, ANC1, recognizing that it no longer has relevant session information, initiates A14 SC Service Request/Response procedures with the SC 32.

d. Upon receipt of the A14 SC Service Request message from the PCF-selected ANC 22, the SC 32 determines which ANC 22 has control of the dormant AT 28, and sends an A14 SC Connection Setup message to that ANC (i.e., ANC2). The SC 32 identifies the correct ANC 22 by use of its routing tag 42, $TAG_{SC}$.

e. ANC1 sends an A9-BS Service Response to the PCF 12. This step can occur anytime after receipt of the A9-BS Service Request message. Upon receipt of this service request, the PCF 12 starts the connection setup timer $T_{NET\_CONN}$.

f. ANC2 then sends a paging message to the AT 28 over the control channel.

g. ANC2 and the AT 28 establish a radio connection per IS-856.

h. ANC2 and the PCF 12 then establish A8/A9 connections. This causes the PCF 12 to update its $TAG_{PCF}$ to point to ANC2. Upon receipt of the A9-Setup-A8 message, the PCF 12 stops timer $T_{NET\_CONN}$. Note that the PCF 12 might use expiration of the timer to determine whether to abort or retry connection reestablishment.

i. After the radio link and the A8 connection are reestablished, data may be exchanged between the reactivated AT 28 and the PDSN 14.

Figure 6:
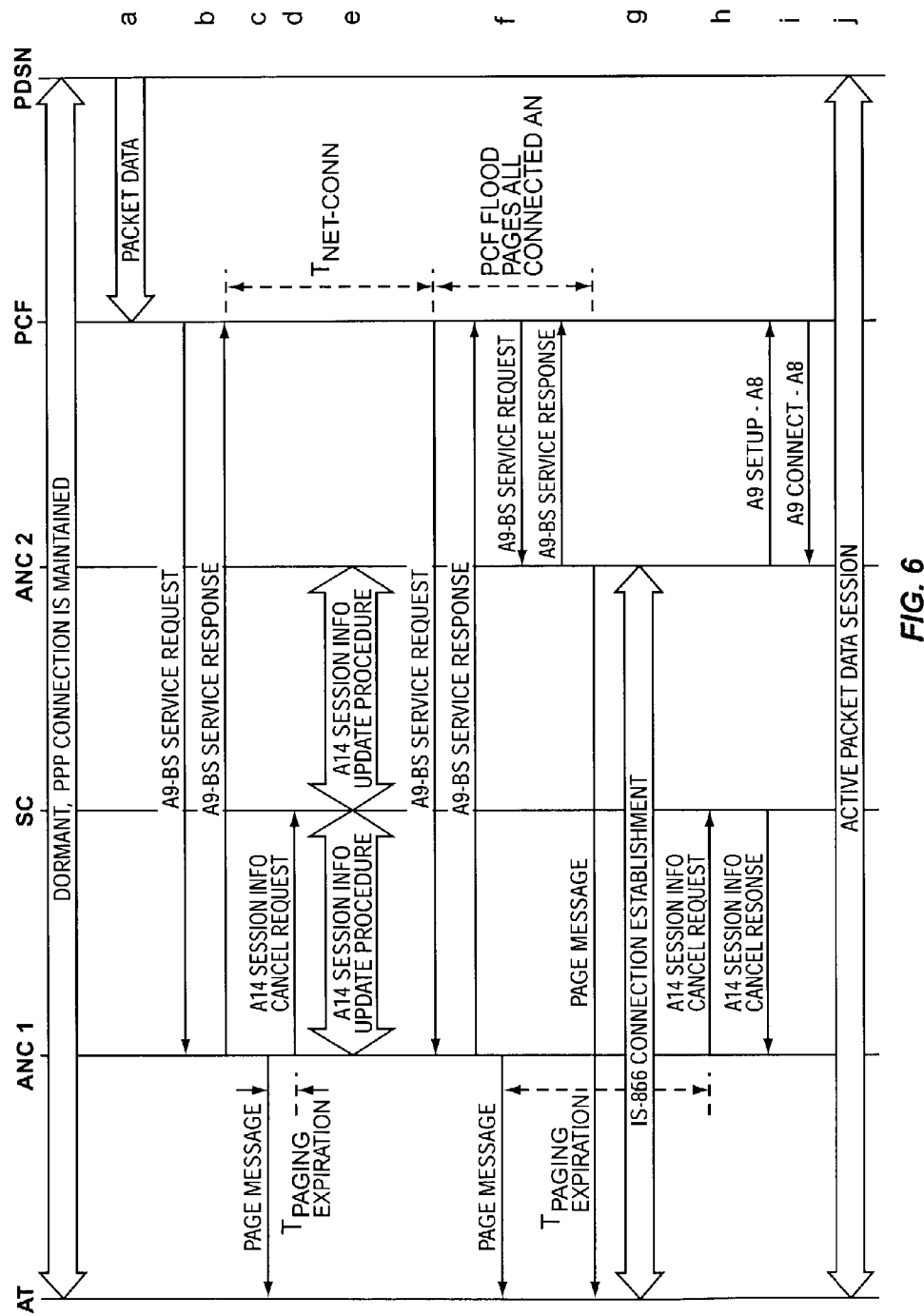
FIG. 6 is a call flow diagram where the SC routing tag is out of date and the PCF sends a service request to all of its associated ANCs.

FIG. 6 illustrates exemplary call flow details where $TAG_{SC}$ in the SC 32 does not point to the correct ANC 22 (i.e., does not point to the ANC 22 currently supporting the dormant AT 28). This scenario might arise where the AT 28 crossed ANC boundaries and did not send a Route Update message or that message was lost. The scenario further assumes that the PCF's router tag 40, $TAG_{PCF}$, also is outdated. Thus, in this instance, neither the PCF 12 nor the SC 32 has up-to-date routing pointers for the AT 28.

Connection reactivation in this scenario comprises the following steps:

a. PDSN 14 sends data packets for a dormant AT 28 to the PCF 12 via an existing A10 connection.

b. The PCF 12 executes A9 BS Service Request/Response procedures with the ANC 22 pointed to by $TAG_{PCF}$ (i.e., ANC1).

c. ANC1 pages the AT 28 in response to receiving the A9 Service Request message from the PCF 22. Because the SC 32 did not receive notice of the AT 28 moving from ANC1, it failed to clear session information from ANC1. Therefore, ANC1 still has session information for the dormant AT 28 and issues a page. ANC1 also starts a paging timer to detect paging failures.

d. When the paging timer expires, ANC1 infers that the AT 28 is no longer in its coverage area and deletes the session information stored for the AT 28. It also sends an A14 Session Info Cancel message to the SC 32.

e. Upon receipt of that Session Info Cancel message, the SC 32 determines which ANC 22 has control of the AT 28 by examining its array $TAG_{SC}$. If the SC 32 cannot determine which ANC 22 is supporting the AT 28, it sends session information for all ANCs 22 supported by it. In the illustrated scenario, the SC 32 sends session information to all ANCs 22 it supports (here, ANC1 and ANC2) by executing A14 Session Information Update procedures with them, such as by the exchange of A14 Session Information Update Request/Response messages. This sets the corresponding entries in $TAG_{SC}$ for both ANC1 and ANC2.

f. In failing to receive an A9-Setup-A8 message from any ANC 22 before expiration of $T_{NET\_CONN}$, the PCF 12 re-sends the A9-BS Service Request message to all ANCs 22 that it supports, in an attempt to establish A8/A9 connections with the ANC 22 currently supporting the AT 28. ANCs 1 and 2 receive this new service request and send paging messages over the control channel in an attempt to contact the AT 28.

g. ANC2 and the AT 28 establish a radio connection per IS-856.

h. When the paging timer at ANC1 expires without a response from the AT 28, ANC1 deletes its session information for AT 28, and sends an A14 Session Information Cancel message to the SC 32. In response, the SC 32 clears the corresponding ANi entry in $TAG_{SC}$, leaving the only set pointer in $TAG_{SC}$ the one corresponding to ANC2.

i. ANC2 and the PCF 12 establish A8/A9 connections, which causes the PCF 12 to update its $TAG_{PCF}$ to point to ANC 2. The routing tags 40 and 42 in the PCF 12 and SC 32, respectively, are now updated.

j. After the radio link and the A8 connection are reestablished, data may be exchanged between the reactivated AT 28 and the PDSN 14.

Figure 7:
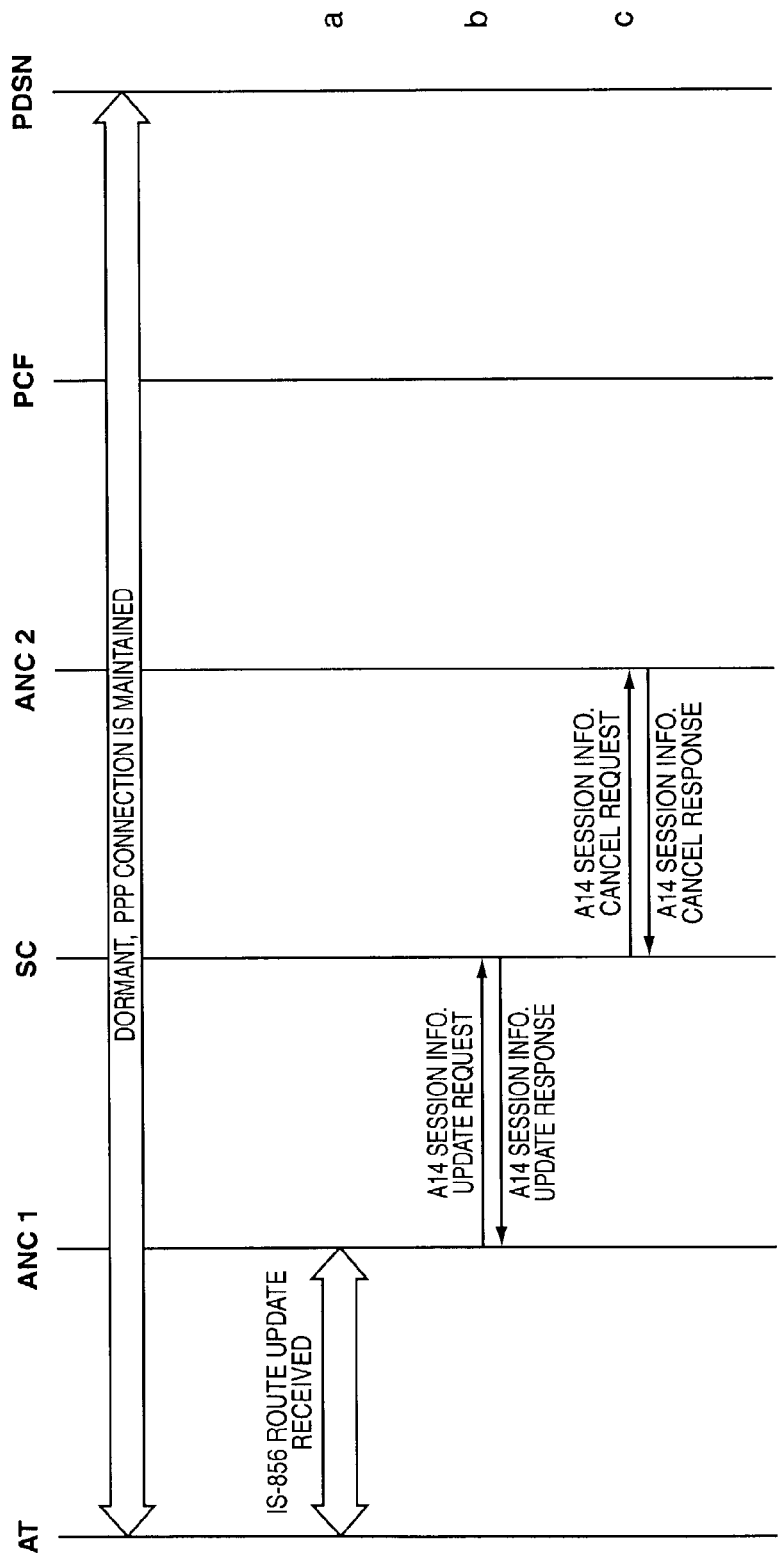
FIG. 7 is a call flow diagram of intra access network handoff of a dormant access terminal with no subnet change.

FIG. 7 illustrates one of several scenarios where the SC 32 eliminates the need to involve the PCF 12 in mobility management signaling. As the dormant AT 28 moves from ANC2 to ANC1, it generates a Route Update message that may be used to keep route pointers in $TAG_{SC}$ current, without the need for updating $TAG_{PCF}$. This minimizes traffic and processing overhead that would otherwise be incurred by the PCF 12 and its network interfaces if intra-subnet handoffs required PCF routing tag updating, which would be the case in the absence of the SC 32.

The illustrated call flow includes the following steps:

a. ANC1 receives a Route Update from the AT 28 after the AT 28 crosses the coverage boundary between ANC 2 and ANC1. That is, ANC1 is receiving the AT 28 from ANC 2.

b. ANC1 sends an A14 Session Info Update Request to the SC 32 to obtain session information for the AT 28. The SC 32 returns the requested session information via the A14 Session Info Update Response message. The SC 32 updates its $TAG_{SC}$ to reflect the handoff from ANC 2 to ANC1.

c. The SC 32 initiates A14 Session Information cancellation procedures (via A14 Session Info Cancel Request/Response messages) with ANC 2. Cancellation of session information for the AT 28 in ANC 2 prevents retention of session information. Without such cancellation, errors might arise if the PCF 12 later attempts to reactivate the call with the AT 28. In that scenario, the routing tag 40 in the PCF 12 would still point to ANC 2 (the source ANC), but the AT 28 would have moved to ANC1 (the target ANC). If source ANC still had session information for the AT 28, it would not immediately forward the PCF's service request to the SC 32, as it should.

Figure 8:
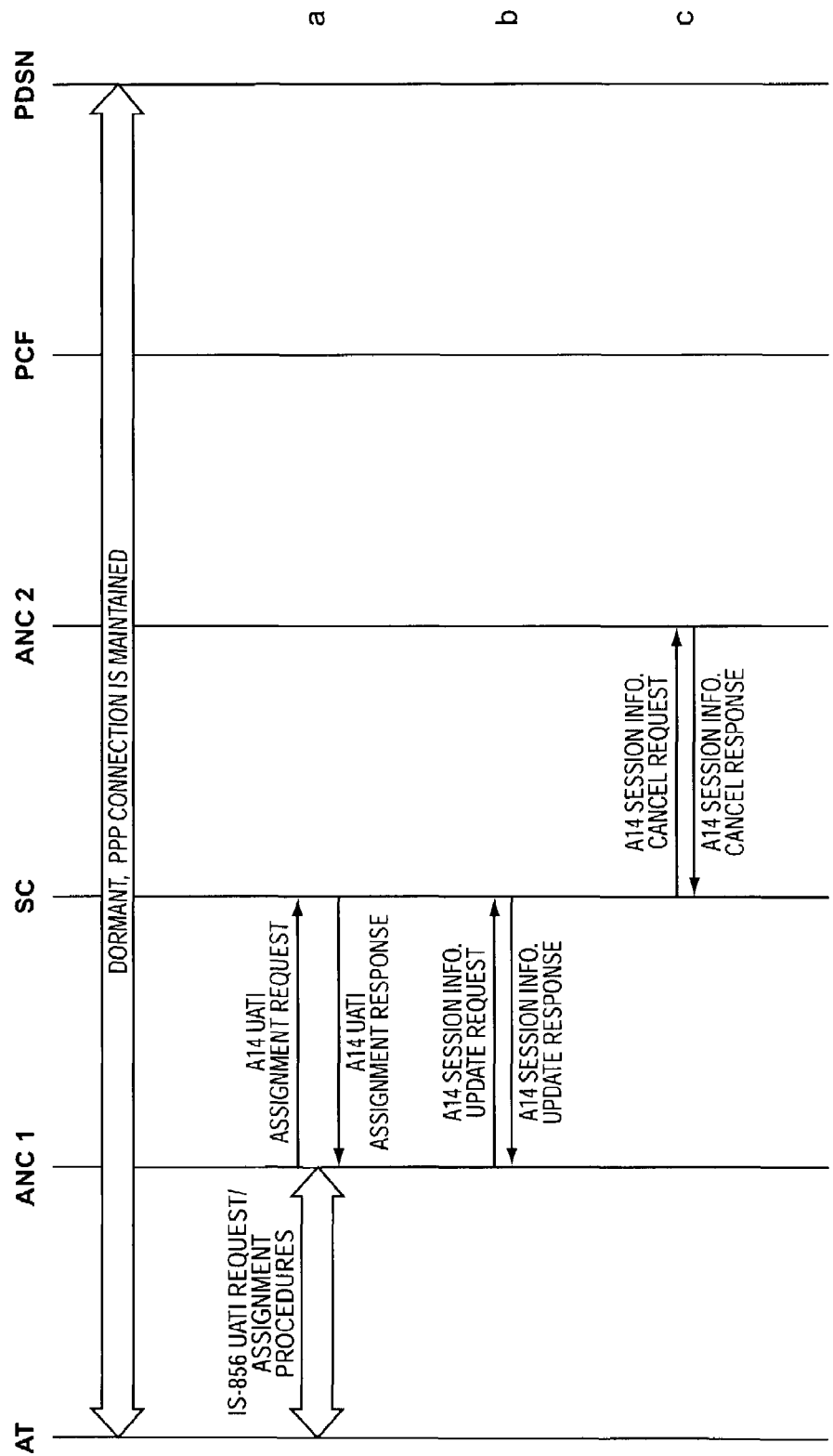
FIG. 8 is a call flow diagram of intra-SC access network handoff of a dormant access terminal with a subnet change.

FIG. 8 illustrates an intra-PCF/intra-SC handoff where the AT 28 changes subnets 26. This scenario assumes that ANC 2 and ANC1 are in different subnets 26, and that the AT 28 moves from ANC2 to ANC1. With a subnet change the AT 28 sends a request for a new UATI to the target ANC.

Call processing includes the following steps:

a. The AT 28 and ANC1 (target ANC) perform IS-856 UATI Assignment Procedures in response to the AT crossing into ANC1's coverage area. Upon receipt of the UATI Assignment message ANC1 sends an A14 UATI Assignment Request message to the controlling SC 32. The controlling SC 32 determines that a session exists with the associated UATI and sends an A14 UATI Assignment Response message to ANC1, which in turn will send the associated air interface message to the AT 28.

b. The SC 32 has stored session information associated with the UATI and it sends this information to ANC1 via A14 signaling procedures (A14 Session Info Update Request/Response messages). The SC 32 will update the $TAG_{SC}$ to reflect the change from ANC2 to ANC1.

c. The SC 32 initiates A14 Session Information Cancellation procedures (via A14 Session Info Cancel Request/Response messages) with ANC2 (the source ANC 22). The SC 32 knows the source ANCID based on the previous $TAG_{SC}$ (i.e. prior to update in step b).

Figure 9:
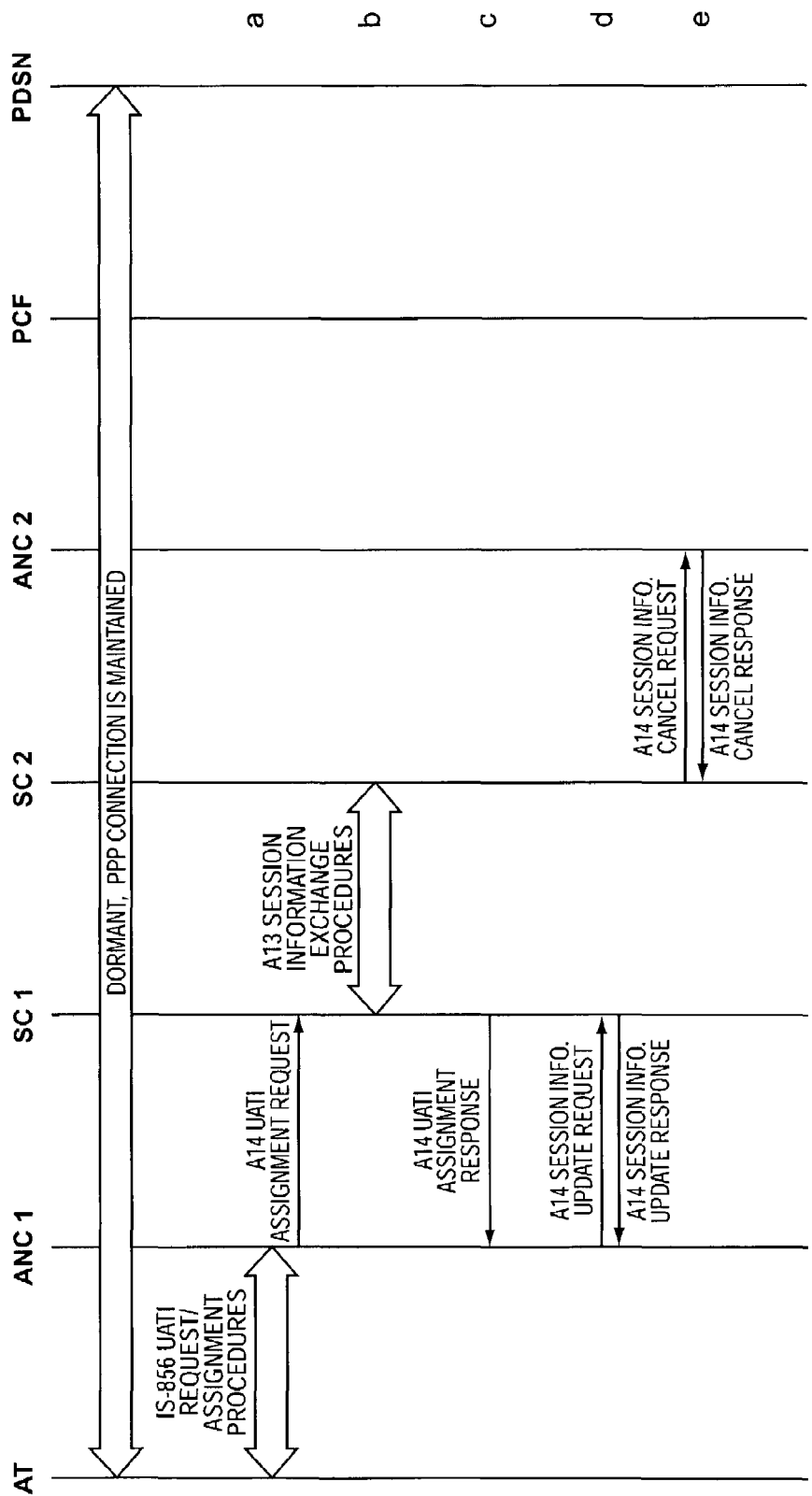
FIG. 9 is a call flow diagram of intra-PCF, inter-SC and access network handoff of a dormant access terminal with a subnet change.

FIG. 9 illustrates exemplary call flow for an intra-PCF/inter-SC dormant handoff of an AT 28, where different SCs 32 are used to manage the involved subnets. In this scenario, the source SC 32 (SC2) may be used to provide session information to the target SC 32 (SC1). Here, "source" refers to the SC 32 managing the subnet 26 from which the AT 28 is being handed off from, and "target" refers to the SC 32 managing the subnet 26 receiving the AT 28. Thus, the involved SCs 32 support such movement by sharing or transferring session information for the AT 28.

Several approaches are available for coordinating communication between SCs 32. For example, a SC 32 might query neighboring SCs 32 for needed session information based on which SCs 32 are associated with the neighboring or closest subnets, for example. In any case, exemplary call flow includes the following steps:

a. The AT 28 and target ANC 22 (ANC1) perform IS-856 UATI Assignment Procedures (the AT 28 crosses a subnet boundary). Upon receipt of the UATI Assignment message, ANC1 sends an A14 UATI Assignment Request message to the target SC 32 (SC1).

b. In this scenario, SC1 does not have the stored session information associated with the UATI and sends a request to the source SC 32 (SC2) to obtain session information for the AT 28 in questions using A13 signaling procedures for inter-SC communication. SC2 returns the requested session information to SC1.

c. SC1 then sends an A14 UATI Assignment Response message to ANC1, which in turn sends the associated air interface message to the AT 28.

d. SC1 then sends the session information received over the A13 interface to ANC1 via A14 signaling procedures (A14 Session Info Update Request/Response messages). SC1 also updates its $TAG_{SC}$ so track movement of the AT 28 into the coverage area of ANC1.

e. SC2 initiates A14 Session Information cancellation procedures (via A14 Session Info Cancel Request/Response messages) with ANC2. SC2 also clears the array entry for ANC2 in its array $TAG_{SC}$.

Figure 10:
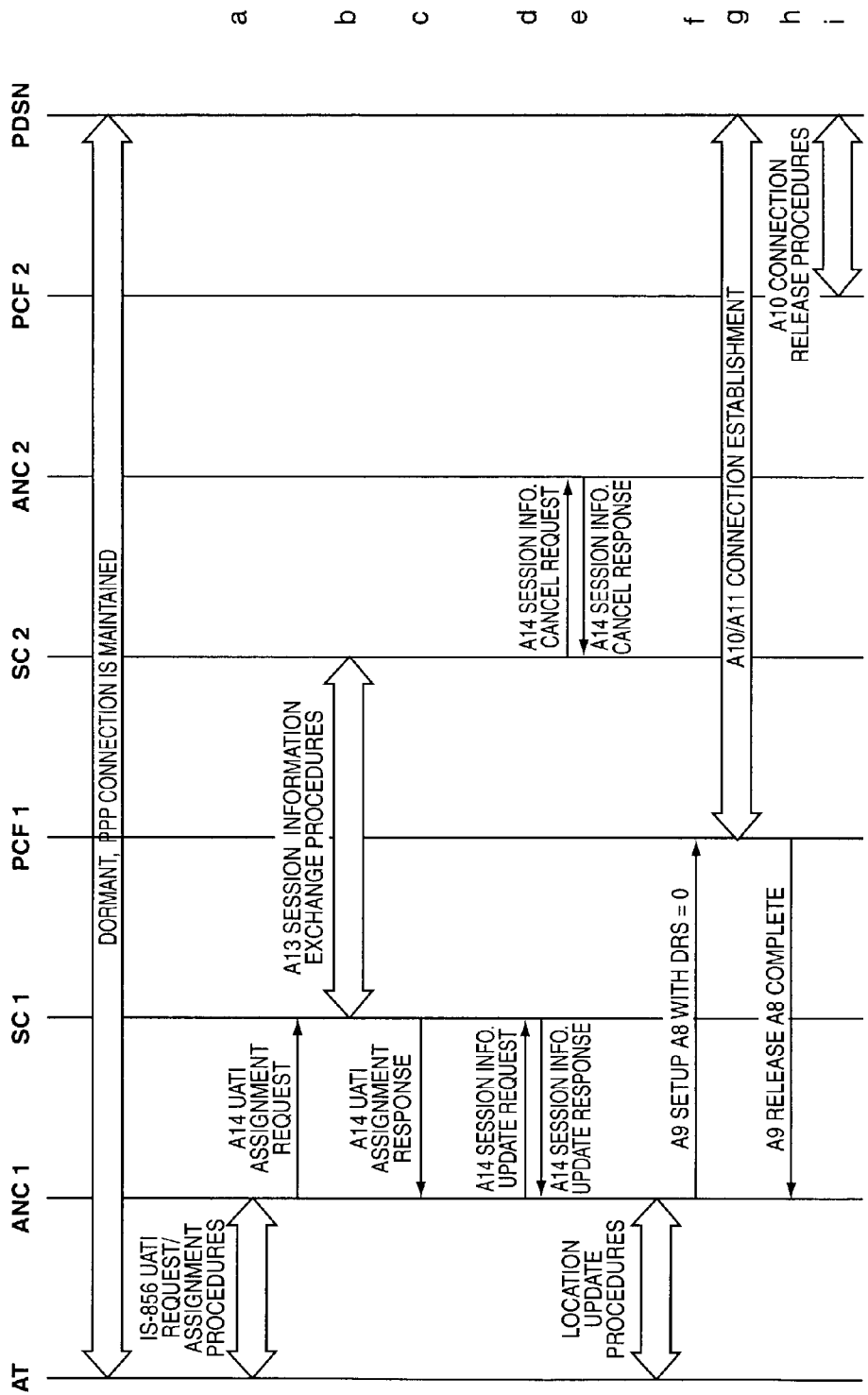
FIG. 10 is a call flow diagram of inter-SC/inter-PCF handoff.

FIG. 10 illustrates exemplary call flow for an inter-PCF/inter-SC dormant handoff of an AT 28, where different SCs 32 belonging to different PCFs 12 are used to manage the involved subnets 26. In this scenario, the source SC 32 (SC2) may be used to provide session information to the target SC 32 (SC1). Here, "source" refers to the SC 32 managing the subnet 26 from which the AT 28 is being handed off from, and "target" refers to the SC 32 managing the subnet 26 receiving the AT 28. Thus, the involved SCs 32 support such movement by sharing or transferring session information for the AT 28.

Several approaches are available for coordinating communication between SCs 32. For example, a SC 32 might query neighboring SCs 32 for needed session information based on which SCs 32 are associated with the neighboring or closest subnets 26, for example. In any case, exemplary call flow includes the following steps:

a. The AT 28 and target ANC 22 (ANC1) perform IS-856 UATI Assignment Procedures (the AT 28 crosses a subnet boundary). Upon receipt of the UATI Assignment message, ANC1 sends an A14 UATI Assignment Request message to the target SC 32 (SC1).

b. In this scenario, SC1 does not have the stored session information associated with the UATI and sends a request to the source SC 32 (SC2) to obtain session information for the AT 28 in questions using A13 signaling procedures for inter-SC communication. SC2 returns the requested session information to SC1.

c. SC1 then sends an A14 UATI Assignment Response message to ANC1, which in turn sends the associated air interface message to the AT 28.

d. SC1 then sends the session information received over the A13 interface to ANC1 via A14 signaling procedures (A14 Session Info Update Request/Response messages). SC1 also updates its $TAG_{SC}$ so track movement of the AT 28 into the coverage area of ANC1.

e. SC2 initiates A14 Session Information cancellation procedures (via A14 Session Info Cancel Request/Response messages) with ANC2. SC2 also clears the array entry for ANC2 in its array $TAG_{SC}$.

f. ANC1 initiates IS-856 Location Update Procedures with the AT to obtain the Previous Access Node ID (PANID) from the AT. ANC1 will compare the PANID with the Current Access Node ID (CANID) stored at the ANC. If CANID is different than the received PANID, ANC1 and PCF 1 will perform A8/A9 connection establishment. ANC 1 will send a A9-Setup-A8 message to PCF1 with DRI=0.

g. Upon receipt of the A9-Set-Up A8 message, PCF1 will set its $TAG_{PCF}$ to point to ANC1. Additionally, PCF1 and the PDSN perform A10/A11 Connection establishment as per TIA/EIA/IS-2001-A Section 2.15. In this scenario, the PDSN has no data to send to the AT and indicate this status to the PCF1.

h. PCF1 initiates A8 release procedures and sends an A9 Release A8 message to ANC1.

i. PDSN and PCF2 initiate A10 connection clearing procedures as per TIA/EIA/IS-2001-A Section 2.15. Upon successful release of the A10 connection, PCF 2 will clear $TAG_{PCF}$ associated with the AT.

In general, the above discussion details exemplary mobility management operations of the SC 32 in accordance with the present invention. However, implementation and operation of the SC 32 is subject to much variation, and these details should not be construed as limiting the present invention. Indeed, the present invention broadly provides for a new logical network entity (the SC 32), which facilitates mobility management in 1xEVDO wireless communication networks or other types of data-oriented wireless communication networks. The SC 32 maintains session information supporting AT handoff between ANCs 22, and further maintains routing tags (tags 42), which may be updated to track ATs 28 as they move through and across subnets 26. With these techniques and features, the SC 32 provides for efficient mobility management. Thus, the present invention is limited only by the scope of the following claims, and the equivalents thereof.

What is claimed is:

1. A wireless communication network comprising:
 a packet control function;
 a plurality of access network controllers connected to the packet control function for communicating with an access terminal engaged in a communication session;
 a session controller having memory for storing session information used by one or more of the access network controllers to communicatively couple the access terminal to the packet control function during the communication session, said session controller including a processor programmed to provide the session information to the access network controllers responsive to session information requests from the access network controllers, and to redirect service requests received by a first access network controller from a packet control function to a second access network controller; and
 wherein, in response to transfer of the access terminal from a first one of the access network controllers to a second one of the access network controllers, the session controller sends the session information stored in the session controller to the second access network controller.

2. The wireless communication network of claim 1, wherein the transfer is a dormant handoff.

3. The wireless communication network of claim 1, wherein the second access network controller queries the session controller for session information associated with the access terminal responsive to the transfer of the access terminal from the first access network controller to the second access network controller.

4. The wireless communication network of claim 3, wherein the session controller provides the session information associated with the access terminal to the second access network controller responsive to receiving a query from the second access network controller.

5. The wireless communication network of claim 4, wherein the first access network controller removes session information for the access terminal in response to an cancellation request message from the session controller.

6. The wireless communication network of claim 1, wherein the first access network controller removes session information for the access terminal stored in the first access network controller in response to the transfer of the access terminal from the first access network controller to the second access network controller.

7. The wireless communication network of claim 1, wherein the session controller further stores in memory routing information indicating which of the plurality of access network controllers is currently identified with the access terminal by the session controller.

8. The wireless communication network of claim 7, wherein the session controller updates the routing information in response to the transfer of the access terminal from the first access network controller to the second access network controller.

9. The wireless communication network of claim 8, wherein the routing information comprises a routing tag for each one of the plurality of access network controllers, wherein the session controller sets said routing tag to indicate that a corresponding access network controller is currently identified with the access terminal and clears said routing tag to indicate that a corresponding access network controller is not currently identified with the access terminal.

10. The wireless communication network of claim 9, wherein the session controller updates the routing information by setting the routing tag corresponding to the second access network controller.

11. The wireless communication network of claim 9, wherein the session controller updates the routing information by clearing the routing tag corresponding to the first access network controller.

12. The wireless communication network of claim 11, wherein the session controller sends a cancellation request message to the first access network controller responsive to the transfer of the access terminal from the first access network controller to the second access network controller, and wherein the first access network controller removes session information associated with the access terminal stored in the first access network controller in response to the cancellation request message from the session controller.

13. The wireless communication network of claim 7, wherein the session controller updates the routing information responsive to a session cancellation message from an access network controller.

14. The wireless communication network of claim 7, wherein the session controller sends a session update message to one or more of the access network controllers if the session controller detects that the access terminal is not currently identified with any one of the plurality of access network controllers.

15. The wireless communication network of claim 14, wherein the access network controllers page the access terminal in response to receipt of the session update message by the access network controllers.

16. The wireless communication network of claim 15, wherein the access network controllers send a session cancellation message to the session controller if the access terminal does not respond to the page within a predetermined time, and wherein the session controller updates the routing information responsive to the session cancellation message.

17. The wireless communication network of claim 7, wherein the packet control function maintains routing information in memory indicating which access network controller is currently identified with the access terminal by the packet control function.

18. The wireless communication network of claim 17, wherein the packet control function updates the routing information when the packet control function receives a connection request associated with the access terminal from one of said plurality of access network controllers.

19. The wireless communication network of claim 17, wherein the packet control function sends a service request to the access network controller currently identified with the access terminal by the packet control function in response to receiving data to be delivered to the access terminal.

20. The wireless communication network of claim 19, wherein the access network controller receiving the service request from the packet control function initiates redirection of the service request received from the packet control function if the access network controller does not have session information associated with the access terminal.

21. The wireless communication network of claim 20, wherein redirecting the service request comprises:
 sending a notification from the access network controller receiving the service request to the session controller; and
 sending a connection setup request from the session controller to the access network controller currently identified with the access terminal by the session controller.

22. The wireless communication network of claim 21, wherein the access network controllers are operative to send a connection request to the packet control function to establish a connection with said packet control function responsive to receiving a connection setup request from the session controller.

23. The wireless communication network of claim 1, wherein the network comprises a 1xEVDO wireless communication network.

24. The wireless communication network of claim 1, wherein the session controller assigns a Universal Access Terminal Identifier to said access terminal.

25. A session controller for use in a wireless communication network including a plurality of access network controllers, the session controller comprising:
   memory to store session information associated with an access terminal engaged in a communication session, and routing information indicating which of the plurality of access network controllers is currently identified with the access terminal, wherein the routing information comprises a routing to for each one of the plurality of access network controllers, wherein the session controller sets said routing tag to indicate that a corresponding access network controller is currently identified with the access terminal and clears said routing tag to indicate that a corresponding access network controller is not currently identified with the access terminal;
   a processor programmed to provide the session information to the access network controllers responsive to session information requests from the access network controllers, and to redirect service requests received by a first access network controller from a packet control function to a second access network and
   wherein the session controller updates the routing information in response to the transfer of the access terminal from the first access network controller to the second access network controller.

26. The session controller of claim 25, wherein the access network controllers generate a session information request responsive to the transfer of the access terminal from the first access network controller to the second access network controller.

27. The session controller of claim 26, wherein said session controller sends a cancellation request message to the first access network controller to initiate removal of session information associated with the access terminal stored at the first access network controller.

28. The session controller of claim 25, wherein the session controller updates the routing information by setting the routing tag corresponding to the second access network controller.

29. The session controller of claim 28, wherein the session controller updates the routing information by clearing the routing tag corresponding to the first access network controller.

30. The session controller of claim 25, wherein the session controller updates the routing information responsive to a session cancellation message from an access network controller.

31. The session controller of claim 25, wherein the session controller sends a session update message to one or more of the access network controllers if the session controller detects that the access terminal is not currently identified with any one of the plurality of access network controllers.

32. The session controller of claim 25, wherein redirecting service requests sent by the packet control function to a first access network controller comprises:
   receiving a service request notification from said first access network controller; and
   sending a connection setup request to the second access network controller, which is currently identified with the access terminal by the session controller.

33. The session controller of claim 25, wherein the session information comprises data connection information associated with a data connection between the access terminal and the packet control function in the wireless communication network.

34. The session controller of claim 33, wherein the data connection information comprises IP address information and network identifier information associated with the access terminal.

35. The session controller of claim 25, wherein the session information stored by the session controller conforms to the IS-856 HDR network standard.

36. The session controller of claim 25, wherein the session controller assigns a Universal Access Terminal Identifier to said access terminal.

37. A method of mobility management in a wireless communication network having a plurality of access network controllers and a packet control function communicatively connected to the plurality of access network controllers, the method comprising:
   storing session information associated with an access terminal in a session controller that is communicatively connected to the plurality of access network controllers; and
   storing routing information in the session controller indicating which of the plurality of access network controllers is currently identified with the access terminal by the session controller, wherein the routing information comprises a routing tag for each one of the plurality of access network controllers, and wherein the session controller sets the routing tag to indicate that a corresponding access network controller is currently identified with the access terminal and clears the routing tag to indicate that the corresponding access network controller is not identified with the access terminal;
   receiving a session information request by the session controller from one of the access network controllers;
   sending the session information stored in the session controller to the requesting access network controller;
   redirecting a service request received by a first access network controller from a packet control function to a second access network controller; and
   updating the routing information in response to a transfer of the access terminal from a first access network controller to the second access network controller.

38. The method of claim 37, further comprising generating the session information request at a second access network controller responsive to the transfer of the access terminal from a first access network controller to the second access network controller, and sending the session information request from the second access network controller to the session controller.

39. The method of claim 38, further comprising sending a cancellation request from the session controller to the first access network controller to initiate removal of the session information stored in the first access network controller.

40. The method of claim 39, further comprising removing session information associated with the access terminal stored in the first access network controller in response to the cancellation request message.

41. The method of claim 37, wherein updating the routing information comprises setting the routing tag for a first access network controller.

42. The method of claim 41, wherein updating the routing information further comprises clearing the routing tag for a second access network controller.

43. The method of claim 37, further comprising sending a session cancellation message from an access network controller currently identified with the access terminal to the session controller, and updating the routing information stored in the session controller in response to the session cancellation message.

44. The method of claim 37, further comprising sending a session update message from the session controller to one or more of the access network controllers when the session controller detects that the access terminal is not currently identified with any one of the plurality of access network controllers.

45. The method of claim 44, further comprising paging the access terminal by the one or more access network controllers in response to the session update message.

46. The method of claim 45, further comprising sending a session cancellation message from an access network controller to the session controller if the access network controller does not receive a response from the access terminal to a paging message sent by the access network controller.

47. The method of claim 37, wherein redirecting a service request comprises:
sending a service request notification from the first access network controller to the session controller; and
sending a connection setup request from the session controller to the second access network controller currently, which is currently identified with the access terminal by the session controller.

48. The method of claim 37, further comprising maintaining routing information at the packet control function indicating which of the access network controllers is currently identified with the access terminal by the packet control function.

49. The method of claim 48, further comprising updating the routing information when the packet control function receives a connection identified with the access terminal from an access network controller.

50. The method of claim 37, wherein the network comprises a 1xEVDO network.

51. The method of claim 37, further comprising assigning a Universal Access Terminal Identifier to access terminal by the session controller.

52. A method of reestablishing a data connection between a packet control function and a dormant access terminal that has moved from a first access network controller to a second access network controller, said method comprising:
sending a service request from the packet control function to the first access network controller indicated by routing information stored in the packet control function as being currently identified with said access terminal;
sending a service request notification from the first access network controller to a session controller;
sending a connection setup request from said session controller to said second access network controller indicated by routing information stored in said session controller as being currently identified with said access terminal; and
sending a connection request from said second access network controller to said packet control function.

53. The method of claim 52 wherein said packet control function updates its routing information to indicate that said second access network controller is currently identified with the access terminal by the packet control function in response to receiving the connection request from the second access network controller.

54. The method of claim 52 further comprising storing session information associated with the dormant access terminal in the session controller.

55. The method of claim 54 further comprising sending the session information stored in the session controller to the second access network controller responsive to the movement of the access terminal from the first access network controller to the second access network controller.

56. The method of claim 55 wherein the second access network controller sends a session information request to the session controller in response to the movement of the access terminal from the first access network controller to the second access network controller, and wherein sending the session information stored in the session controller to the second access network controller includes sending the session information stored in the session controller to the second access network controller responsive to receiving the session information request by the session controller.

57. The method of claim 56 further comprising using the session information at the second access network controller to reestablish a data connection between the access terminal and the packet control function.

* * * * *

UNITED STATES PATENT AND TRADEMARK OFFICE
CERTIFICATE OF CORRECTION

PATENT NO. : 7,457,265 B2  Page 1 of 1
APPLICATION NO. : 10/002723
DATED : November 25, 2008
INVENTOR(S) : Julka et al.

It is certified that error appears in the above-identified patent and that said Letters Patent is hereby corrected as shown below:

In Column 8, Line 7, delete "$T_{NET-CONN.}$" and insert -- $T_{NET\_CONN.}$ --, therefor.

In Column 8, Line 19, delete "$T_{NET-CONN}$" and insert -- $T_{NET\_CONN}$ --, therefor.

In Column 9, Line 15, delete "$T_{NET-CONN.}$" and insert -- $T_{NET\_CONN.}$ --, therefor.

In Column 9, Line 23, delete "$T_{NET-CONN.}$" and insert -- $T_{NET\_CONN.}$ --, therefor.

In Column 15, Line 18, in Claim 25, delete "to" and insert -- tag --, therefor.

In Column 15, Line 30, in Claim 25, delete "network" and insert -- network controller; --, therefor.

Signed and Sealed this

Twenty-sixth Day of May, 2009

JOHN DOLL
*Acting Director of the United States Patent and Trademark Office*